Patented May 9, 1950

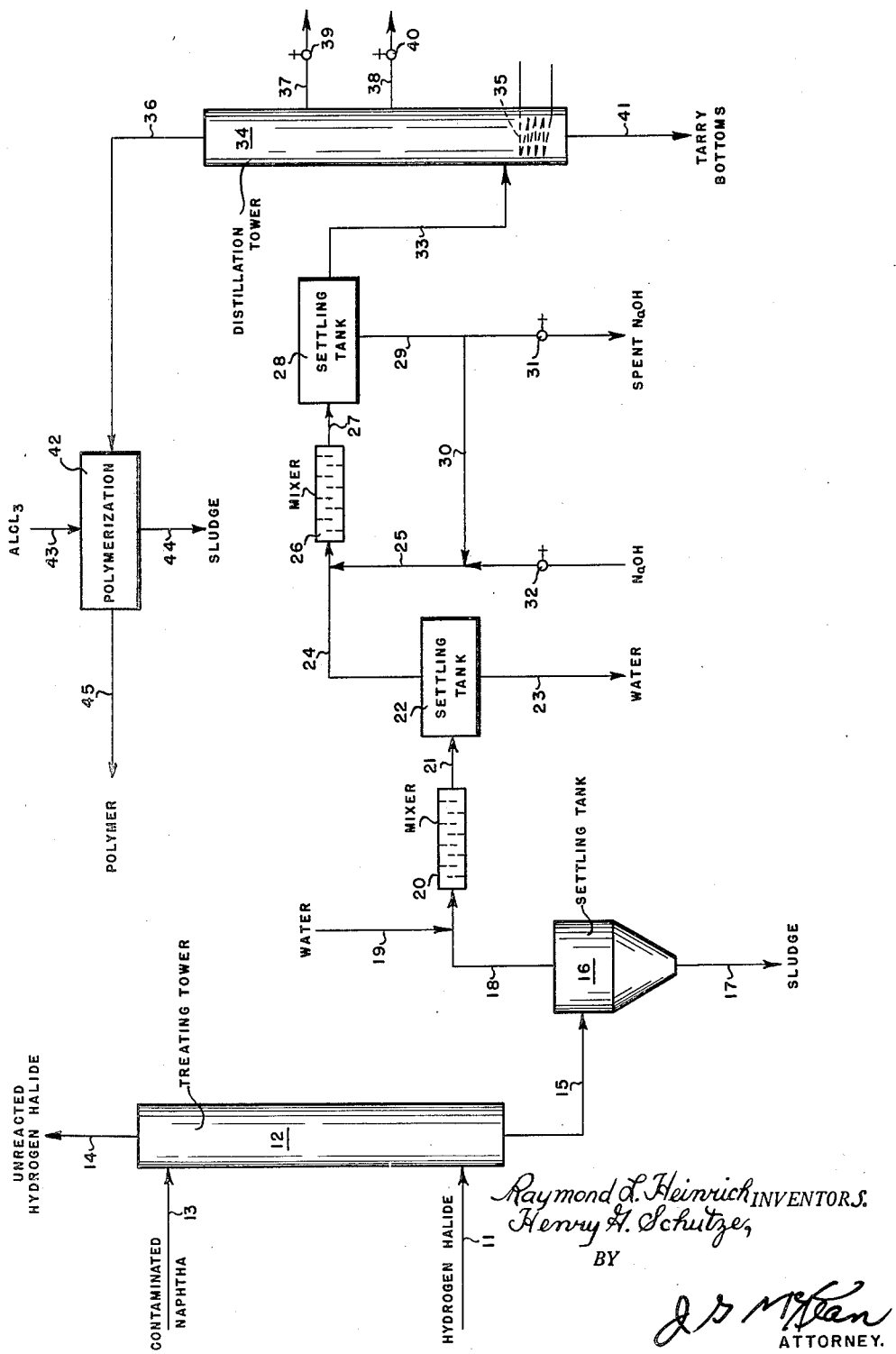

2,507,103

UNITED STATES PATENT OFFICE 2,507,103

TREATMENT OF CONTAMINATED NAPHTHA

Raymond L. Heinrich, Baytown, and Henry G. Schutze, Goose Creek, Tex., assignors, by mesne assignments, to Standard Oil Development Company, Elizabeth, N. J., a corporation of Delaware Application November 28, 1947, Serial No. 788,634

4 Claims. (Cl. 196—78)

The present invention is directed to a method for treatment of naphtha containing contaminating bodies. More particularly, the invention is concerned with a method for removing oxygenated and other deleterious compounds from hydrocarbons containing them. As a more particular aspect, the invention is concerned with a method for treating a naphtha containing contaminating bodies and olefins to make the olefins available for polymerization to lubricating oil polymer.

The production of hydrocarbons and oxygenated organic compounds from carbon monoxide and hydrogen has been known for some time. This reaction was discovered by Fischer and Tropsch of Germany and has resulted in a considerable amount of attention from the workers in this field. The product from this reaction comprises hydrocarbons of the paraffinic and olefinic type, and besides, oxygenated compounds such as the ketones, esters, aldehydes, and alcohols, with the alcohols predominating. Water is also produced and the oxygenated compounds distribute themselves between the hydrocarbon and the water formed as the product, the oxygenated compounds more nearly like the hydrocarbons are soluble in the hydrocarbon and the oxygenated compounds more nearly like water are soluble in the water. Therefore, the hydrocarbons containing dissolved oxygenated organic compounds present a problem to the user of these materials.

The olefins which are produced in substantial amounts in the synthesis of carbon monoxide and hydrogen are quite useful feed stocks for polymerization, alkylation, and other similar reactions. However, the presence of the oxygenated organic compounds, of the type mentioned before, in admixture with the olefins affects deleteriously catalytic reactions such as polymerization reactions when a Friedel-Crafts type catalyst is employed. For example, some of the olefins are very useful feed stocks for polymerization of olefins, in the presence of aluminum chloride, to higher boiling polymer having lubricating oil qualities. The oxygenated organic compounds, however, may react with aluminum chloride and with the olefins to form deleterious products. Not only does an inter-reaction occur between the olefins and the oxygenated organic compounds to affect deleteriously the quality of the product, but the presence of the oxygenated organic compounds consumes valuable amounts of the catalyst itself.

The problem of removing these oxygenated organic compounds and other contaminating bodies from olefinic hydrocarbons produced from the synthesis of hydrocarbons and oxygenated organic compounds from carbon monoxide and hydrogen is one of long standing and has attracted the attention of many workers. A number of expedients have been suggested which include solvent extraction and various other treatments to remove these deleterious organic compounds. While some of the prior art methods have been quite effective, nearly all of them are open to disadvantages in that valuable chemicals are required or expensive purification procedures are necessary before the hydrocarbons are suitable for use in catalytic conversion operations.

It is, therefore, the main object of the present invention to provide a relatively simple process whereby the contaminating bodies are removed from olefinic hydrocarbons produced in the synthesis reaction of carbon monoxide and hydrogen.

Another object of the present invention is to provide a process for treating an olefinic hydrocarbon fraction which is contaminated with oxygenated and other organic compounds.

The objects of the present invention may be achieved by subjecting the contaminated naphtha, including olefins and oxygenated organic compounds, to treatment with a hydrogen halide whereby the hydrogen halide effectively converts the contaminating bodies to less deleterious bodies which do not interfere with the reaction.

Briefly, the present invention may be described as involving the treatment of a hydrocarbon fraction containing contaminating oxygenated and other organic compounds with a hydrogen halide under conditions to form a reaction product which is removed. The hydrogen halide treated naphtha may then be washed with water, neutralized with an alkaline solution, and then distilled to recover a fraction which is suitable as a feed stock for a catalytic conversion operation, such as a polymerization operation.

The hydrogen halide employed in the present invention may be any one of the several hydrogen halides. For example, it may be hydrogen chloride, hydrogen fluoride, or hydrogen iodide, or it may be a hydrohalic acid such as hydrochloric acid, hydrofluoric acid, hydrobromic acid, or hydroiodic acid. Preferably, however, the hydrogen halide or hydrohalic acid is hydrogen chloride or a concentrated solution of hydrochloric acid. For example, anhydrous hydrogen chloride gas is eminently suitable in the practice of the present invention while a concentrated hydrochloric acid including about 20% to 35% of hydrogen chloride may also be used. The amount of hydrogen halide or hydrohalic acid employed as the treating reagent should be sufficient to react with the undesirable reactive materials in the contaminated catalyst. As an example, an amount of hydrogen chloride slightly in excess of one mole of hydrogen chloride per mole of undesirable contaminated compound in the mixture is usually sufficient to improve greatly the polymerization characteristics of the contaminated naphtha. It will be seen that the amount of treating reagent should vary directly with the amount of contaminating material in the naphtha.

The hydrogen halide or hydrohalic acid employed as a treating agent may be contacted with the contaminated naphtha while maintaining substantially atmospheric temperatures. A temperature of about 80° F. gives satisfactory results.

After the naphtha has been treated with the hydrogen halide, it should be settled to allow removal of the reaction product which will separate as a sludge. The sludge should be removed and the treated naphtha washed with water to remove traces of sludge and residual halides or hydrogen halide, following which the washed naphtha should be neutralized with an alkaline solution, such as a sodium hydroxide or sodium carbonate solution or other aqueous alkaline solution. After the neutralization treatment, the naphtha which has been substantially freed of contaminating bodies may be subjected to a distillation operation to recover an overhead fraction which is suitable for the catalytic conversion operation, for example, a catalytic polymerization step. A tarry bottoms fraction may be discarded.

The invention will now be further illustrated by reference to the drawing in which the sole figure presents a flow diagram of one mode of practicing the invention. Referring now to the drawing, numeral 11 designates a line by way of which a hydrogen halide, such as for example, anhydrous hydrogen chloride, is introduced into a treating tower 12, into which the contaminated naphtha, containing olefins and oxygenated organic bodies of the type illustrated, is introduced by line 13. Treating tower 12 may be a suitable treating tower equipped with suitable internal equipment, such as bell caps, baffle plates, trays and the like, which will allow intimate contact between the hydrogen halide and the naphtha which flow countercurrent to each other. As the naphtha flows downwardly in the treating tower 12, the hydrogen halide flows upwardly and contacts the naphtha and removes or converts the contaminating bodies to less deleterious ones. Unreacted gas is discharged from the treating tower 12 by line 14, while the treated naphtha is withdrawn by line 15 into a settling tank 16, which is of sufficient capacity to provide a residence time to allow a separation by gravity of the sludge formed in the treating tower 12 from the treated naphtha. The sludge is withdrawn from settling tank 16 by line 17 and discharges thereby from the system for further processing or handling as may be desired.

Treated naphtha flows from tank 16 by line 18 and has admixed with it water introduced by line 19. The water and treated naphtha flow through incorporator 20, or other mixing device, which provides intimate admixture of the water and treated naphtha. The mixture discharges from incorporator 20 by line 21 into a settling vessel 22 in which the water is separated from the washed naphtha. The water may be discharged from the system by line 23. The treated naphtha overflows from the settling tank 22 by line 24 and has admixed with it an alkaline solution, such as a sodium hydroxide solution introduced by line 25, with the admixture of washed naphtha and alkaline solution flowing into an incorporator 26, or other mixing device, to obtain intimate contact between the naphtha and alkaline solution. The mixture then discharges by way of line 27 into a settling tank 28 wherein the alkaline solution, such as sodium hydroxide, is separated by gravity from the treated naphtha and withdrawn by line 29. A portion or all of this withdrawn alkaline solution may be circulated to treat additional amounts of the washed naphtha by way of branch line 30 and line 25. It will be desired, however, to withdraw periodically a portion of the alkaline solution by opening valve 31 in line 29 and introducing a solution of fresh alkaline solution by opening valve 32 in line 25. In this manner, the strength of the alkaline solution may be maintained at a fairly constant level to remove acidic bodies.

The washed and neutralized naphtha discharges from settling tank 28 by line 33 into a distillation tower 34. Distillation tower 34 may be a series of distillation towers but, for simplicity of description, it is shown as a single distillation tower which is equipped with suitable internal contacting equipment, such as bell caps, baffle plates, trays and the like, to allow intimate contact between vapors and liquids. Conditions of temperature and pressure are adjusted in distillation tower 34 by means of a heating coil or other heating means 35. Distillation tower 34 is provided with a line 36 by way of which an overhead fraction may be obtained and with lines 37 and 38, controlled, respectively, by valves 39 and 40, through which side streams of desired boiling ranges may be withdrawn. Heavy tarry bottoms may be discharged from distillation tower 34 by line 41. The fraction withdrawn from distillation tower 34 by line 36 will usually have a boiling range approximately within the boiling range of the contaminated naphtha, and this fraction may be routed to a polymerization zone indicated by the block 42, into which aluminum chloride may be introduced by line 43 to serve as a polymerization catalyst and from which aluminum chloride sludge may be withdrawn by line 44. A polymer is recovered from polymerization zone 43 by line 45 and this polymer may be suitably fractionated to recover material in the lubricating oil boiling range having lubricating oil characteristics.

In order to illustrate the invention further, reference will now be made to specific examples in which a fraction boiling in the range between about 350° F. and 400° F. containing olefins, oxygenated organic compounds, and other contaminating bodies was produced by passing a mixture of carbon monoxide and hydrogen over an iron-type catalyst. This fraction was analyzed and found to contain oxygenated organic compounds and olefins as shown in the following table:

*Table I*

Analysis wt. per cent, functional group:

| | |
|---|---|
| OH | 0.60 |
| CHO | 0.36 |
| COOH | 1.70 |
| COO | 1.95 |
| CO | 1.65 |

Bromine No., olefin types:

| | |
|---|---|
| Trans | 6.5 |
| Alpha | 68.4 |
| Tert | 6.9 |
| Cis- | 3.9 |
| Tri-Substituted Ethylenes | 0.1 |

It will be seen from the foregoing analysis of the naphtha that it contained an appreciable quantity of oxygenated organic compounds expressed as functional groups. It will be understood, of course, that the actual content of oxygenated organic compounds is appreciably higher than that shown by the functional groups in view of the distribution of the compounds throughout the boiling range of the fraction given. Actually, a naphtha having the foregoing composition may contain from about 20 to 30 volume percent of oxygenated organic compounds.

The olefin types are expressed conveniently as bromine number olefin types, but actually were determined by infrared spectrophotometry with the percentage of the olefin types being converted to actual bromine number equivalents expressed as centigrams of bromine per gram of fraction analyzed. A fraction having an analysis as reported in the foregoing table was then polymerized employing aluminum chloride as the catalyst at a temperature of 1000° F. The results of this polymerization run are presented in the following table:

*Table II*

| Run Number | Run 1 |
|---|---|
| Charge Stock | Untreated Naphtha |
| Polymerization Conditions: | |
| Temperature, °F | 100 |
| Time, Hours | 2 |
| Catalyst, Wt. percent of Olefins Charged | 14.8 |
| Polymer Yield: | |
| Wt. percent of Olefins Charged | 21.0 |
| Wt. percent of Untreated Naphtha | 11.5 |
| Sludge, Wt. percent of Olefins Charged | 34.8 |
| Tests on Polymer: | |
| Vis. 210° F., S. S. U | (¹) |
| Viscosity Index | (¹) |

¹ This material was a dark brown viscous substance and was in insufficient yield for lube tests. From its appearance, it would be judged to be a lubricant of inferior quality.

As a specific example of the present invention, a naphtha whose composition is given in Table I above and which was obtained from a synthesis reaction, wherein carbon monoxide and hydrogen were passed over an iron-type catalyst to obtain a product including a hydrocarbon, was subjected to treatment with hydrogen chloride for about 10 minutes at about 80° F., the hydrogen chloride being in an anhydrous condition. The hydrogen chloride, as a gas, was passed rapidly into 250 volumes of the naphtha and after the period of time indicated, the flow of hydrogen chloride was terminated. The hydrogen chloride saturated naphtha was then allowed to stand for 16 hours. After this period of standing, about 5 volumes of black sludge was separated from the treated naphtha. The treated naphtha was then washed separately with water and a sodium hydroxide solution following which it was distilled in the presence of steam to obtain a 90% overhead fraction. A second fraction corresponding to a 90–95% overhead fraction was also taken and a 3% bottoms fraction remained. Approximately 2% was unaccounted for and was probably lost as uncondensed gas. The 90% overhead fraction was then subjected to polymerization in the presence of aluminum chloride, 200 volumes of the fraction being reacted with 12 parts by weight of aluminum chloride. The average reaction temperature was 102° F. with a maximum temperature during the polymerization reaction of 169° F. The reaction was allowed to proceed for about 2 hours. A polymer was obtained in a yield corresponding to 46.5 weight per cent of the olefin contained in the feed stock. On the basis of the untreated naphtha, the polymer yield was 18.3 weight per cent. Aluminum chloride sludge amounting to 38.2 weight per cent of the olefins in the feed stock charged was also obtained. The lubricating oil polymers had a gravity of 32.4° A. P. I., a viscosity at 210° F. S. S. U. of 52.3, and a viscosity index of 79. It was found that 2.37 pounds of aluminum chloride were consumed for every gallon of polymer produced.

In another run in accordance with the present invention, a naphtha produced by the reaction of carbon monoxide and hydrogen over an iron-type catalyst and having a boiling range between 110° F. and 400° F. was percolated through silica gel and then treated by washing with 10 volumes per treat of hydrochloric acid containing 35% HCl, following which it was water washed and distilled to obtain an overhead fraction. The treating loss in this step amounted to 4% per volume of charge. Two hundred volumes of this treated naphtha was then contacted with 3.2 parts of aluminum chloride at an average reaction temperature of 152° F., the maximum reaction temperature being 200° F. The reaction took place over a 2 hour period. As a result of this reaction, a lube polymer amounting to 49 volumes was obtained. The lube polymer was tested and found to have a gravity of 34.5° A. P. I., a viscosity at 210° F. S. S. U. of 80.5, and a viscosity index of 101. The amount of aluminum chloride consumed per gallon of polymer was 0.27 pound. This compares with an aluminum chloride consumption averaging 1.13 pounds per gallon on a similar naphtha which had been treated only by percolation through silica gel. It will thus be seen that treatment of naphtha contaminated with oxygenated and other organic compounds in accordance with the present invention, either with or without silica gel percolation, results in substantial improvements and that considerable improvements can be made over naphtha treated only with silica gel.

The naphtha treated in the foregoing run with both silica gel and hydrochloric acid was substantially free of oxygenated and other objectionable organic compounds and the content of olefins, especially alpha olefins, was appreciably enhanced.

In the description of the invention taken with the drawing and in the examples, treated naphtha is subjected to distillation. This distillation operation should preferably be conducted at reduced pressures or in the presence of steam to avoid temperatures which might cause the formation of degradation products. Ordinarily, the distillation will be conducted to recover an overhead fraction or a fraction corresponding in boiling range to the boiling range of the original contaminated naphtha.

The invention has been described and illustrated by examples in which aluminum chloride is employed as the catalyst in the polymerization step. It is to be understood, of course, that other Friedel-Crafts type catalyst, such as boron trifluoride, ferric chloride, titanium chloride, zirconium chloride, and other similar catalysts may be employed in lieu of aluminum chloride. Aluminum chloride, because of its economic availability, will be preferred, however.

The polymerization may be conducted at a temperature in the range between 75° and 250° F., but preferably it will be conducted at a temperature in the range from 75° to 175° F.

The nature and objects of the present invention having been fully described and illustrated, what we wish to claim as new and useful and to secure by Letters Patent is:

1. A method for producing lubricating oil from naphtha boiling in the range between 85° F. and 400° F. containing olefins and contaminated with oxygenated and other objectionable organic compounds which comprises subjecting said contaminated naphtha to contact with a hydrogen halide at substantially atmospheric temperatures to form a product, said hydrogen halide being employed in an amount in excess of one mole of hydrogen halide per mole of contaminating bodies, separating the product from said naphtha, washing and neutralizing said naphtha, subjecting the washed and neutralized naphtha to distillation to obtain a fraction boiling in the range of the said contaminated naphtha, and subjecting said fraction to polymerization in the presence of a Friedel-Crafts catalyst to obtain a polymer having lubricating oil characteristics.

2. A method in accordance with claim 1 in which the hydrogen halide is hydrogen chloride and the Friedel-Crafts catalyst is aluminum chloride.

3. A method for producing lubricating oil from naptha boiling in the range between 85° F. and 400° F. containing olefins and contaminated with oxygenated and other objectionable organic compounds which comprises subjecting said contaminated naphtha to contact with a hydrogen chloride-containing solution at a substantially atmospheric temperature of about 80° F. to form a product, said hydrogen chloride solution being employed in an amount sufficient to provide an excess of one mole of hydrogen chloride per mole of contaminating bodies, separating product from said naphtha, washing and neutralizing said contacted naphtha, subjecting the washed and neutralized naphtha to distillation to obtain a fraction boiling in the range of said contaminated naphtha, and subjecting said fraction to polymerization in the presence of aluminum chloride at a temperature in the range between 75° and 250° F. to obtain a polymer, and separating from said polymer a fraction having lubricating oil characteristics.

4. A method for producing lubricating oil from naptha boiling in the range between 85° F. and 400° F. containing olefins and contaminated with oxygenated and other objectionable organic compounds which comprises subjecting said contaminated naphtha to contact with a bed of silica gel to remove objectionable organic compounds, removing said naphtha from contact with said bed of silica gel, subjecting said contacted naphtha to contact with hydrogen halide at substantially an atmospheric temperature of about 80° F. to form a product, said hydrogen halide being employed in an amount in excess of one mole of hydrogen halide per mole of contaminating bodies, separating the product from said naphtha, washing and neutralizing said naphtha, subjecting the washed and neutralized naphtha to distillation to obtain a fraction boiling in the range of said contaminated naphtha, and subjecting said fraction to polymerization in the presence of a Friedel-Crafts catalyst to obtain a polymer having lubricating oil characteristics.

RAYMOND L. HEINRICH.
HENRY G. SCHUTZE.

REFERENCES CITED

The following references are of record in the file of this patent:

UNITED STATES PATENTS

| Number | Name | Date |
|---|---|---|
| 1,704,732 | Eisenhut | Mar. 12, 1929 |
| 2,019,772 | Van Peski | Nov. 5, 1935 |
| 2,134,241 | Susselbeck | Oct. 25, 1938 |
| 2,165,372 | Haag | July 11, 1939 |

OTHER REFERENCES

U. S. Naval Technical Mission in Europe, Oct. 29, 1945, pages 61 and 62.

Interrogation of Dr. Otto Roelen by C. C. Hall et al., Hobart Pub. Co., Washington, D. C., page 23, published July 18, 1947.

Proceedings of Technical Oil Mission, Washington, D. C., 1945, distributed by Foreign Synthetic Liquid Fuels in Div. Bureau of Mines, Washington, D. C., page 112.